US010688716B2

(12) United States Patent
Abbott, Jr.

(10) Patent No.: US 10,688,716 B2
(45) Date of Patent: *Jun. 23, 2020

(54) CONSOLIDATING A BUILD MATERIAL FOR ADDITIVE MANUFACTURING

(71) Applicant: Hewlett-Packard Development Company, L.P., Houston, TX (US)

(72) Inventor: James Elmer Abbott, Jr., Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 310 days.

This patent is subject to a terminal disclaimer.

(21) Appl. No.: 15/526,948

(22) PCT Filed: Feb. 27, 2015

(86) PCT No.: PCT/US2015/018012
§ 371 (c)(1),
(2) Date: May 15, 2017

(87) PCT Pub. No.: WO2016/010590
PCT Pub. Date: Jan. 21, 2016

(65) Prior Publication Data
US 2017/0326791 A1 Nov. 16, 2017

(51) Int. Cl.
*B29C 64/165* (2017.01)
*B33Y 10/00* (2015.01)
(Continued)

(52) U.S. Cl.
CPC ............ *B29C 64/165* (2017.08); *B29C 48/02* (2019.02); *B29C 48/266* (2019.02); *B29C 48/92* (2019.02);
(Continued)

(58) Field of Classification Search
CPC ... B29C 64/165; B29C 64/386; B29C 64/393; B29C 64/20; B29C 64/205; B29C 64/209; B29C 64/307; B29C 64/364
See application file for complete search history.

(56) References Cited

U.S. PATENT DOCUMENTS

| 5,348,693 A | 9/1994 | Taylor et al. |
| 6,376,148 B1 | 4/2002 | Liu et al. |

(Continued)

FOREIGN PATENT DOCUMENTS

| WO | WO 2005/011959 | 2/2005 |
| WO | WO 2013/113372 | 8/2013 |
| WO | WO2014006192 | 1/2014 |

OTHER PUBLICATIONS

"3D Printing Primer, Part 1", New Technologies, Discovery, Technology and Publishing, Dec. 24, 2014, pp. 1-4, http://discovery.urlibraries.org/?tag=new-technologies.
(Continued)

*Primary Examiner* — Jacob T Minskey
*Assistant Examiner* — Cedrick S Williams
(74) *Attorney, Agent, or Firm* — Dierker & Kavanaugh PC (57) ABSTRACT

In one example, a non-transitory processor readable medium having instructions thereon that when executed cause an additive manufacturing machine to consolidate powdered build material into consolidated powdered build material and then form an object slice in the consolidated build material.

8 Claims, 11 Drawing Sheets

(51) Int. Cl.
  B29C 64/40       (2017.01)
  B29C 64/386      (2017.01)
  B29C 48/02       (2019.01)
  B29C 48/92       (2019.01)
  B29C 48/25       (2019.01)
  B33Y 30/00       (2015.01)
  B33Y 50/02       (2015.01)
  G05B 19/4099     (2006.01)
  B29C 64/393      (2017.01)
  B29C 64/205      (2017.01)

(52) U.S. Cl.
  CPC .......... *B29C 64/205* (2017.08); *B29C 64/386* (2017.08); *B29C 64/393* (2017.08); *B29C 64/40* (2017.08); *B33Y 10/00* (2014.12); *B33Y 30/00* (2014.12); *B33Y 50/02* (2014.12); *G05B 19/4099* (2013.01); B29C 2948/92571 (2019.02); G05B 2219/35134 (2013.01); G05B 2219/49007 (2013.01)

(56) References Cited

U.S. PATENT DOCUMENTS

| | | | |
|---|---|---|---|
| 6,589,471 B1 | 7/2003 | Khoshnevis | |
| 6,596,224 B1 | 7/2003 | Sachs et al. | |
| 2004/0003738 A1* | 1/2004 | Imiolek | B22F 3/1055 101/480 |
| 2006/0071367 A1 | 4/2006 | Hunter et al. | |
| 2007/0238056 A1* | 10/2007 | Baumann | B33Y 10/00 430/325 |
| 2012/0113439 A1 | 5/2012 | Ederer | |
| 2013/0330470 A1 | 12/2013 | Gersch et al. | |
| 2014/0252685 A1 | 9/2014 | Stucker et al. | |
| 2014/0271961 A1 | 9/2014 | Khoshnevis | |
| 2014/0283104 A1* | 9/2014 | Nilsson | G06F 21/10 726/26 |
| 2016/0332373 A1* | 11/2016 | Kuhn | B33Y 70/00 |
| 2016/0333153 A1* | 11/2016 | Hirata | B33Y 80/00 |

OTHER PUBLICATIONS

International Search Report and Written Opinion for International Application No. PCT/US2015/018012 dated May 29, 2015, 25 pages.

Athreya "Mechanical and microstructural properties of Nylon-12/carbon black composites: Selective laser sintering versus melt compounding and injection molding" CS&T 2011 2pgs.

* cited by examiner

CONSOLIDATING A BUILD MATERIAL FOR ADDITIVE MANUFACTURING

BACKGROUND

Additive manufacturing machines produce 3D (three-dimensional) objects by building up layers of material. Some additive manufacturing machines are commonly referred to as "3D printers" because they often use inkjet or other printing technology to apply some of the manufacturing materials. 3D printers and other additive manufacturing machines make it possible to convert a CAD (computer aided design) model or other digital representation of an object directly into the physical object.

DRAWINGS

The same part numbers designate the same or similar parts throughout the figures.

DESCRIPTION

Additive manufacturing machines make a 3D object through the solidification of one or more layers of a build material. Additive manufacturing machines make objects based on data in a 3D model of an object created, for example, with a CAD computer program product. The model data is processed into slices each defining that part of a layer or layers of build material to be solidified.

In some additive manufacturing processes thermal bonding is used to solidify a powdered build material. The powdered build material may be held at an elevated temperature to limit differential shrinkage of the edge of the first slices (formed in the first layers of build material) so that each slice stays flat during solidification. Heating increases power consumption and cost, and can alter the characteristics of the powder sufficient to render otherwise unused powder unfit for recycling back into the manufacturing process. In a thermal bonding process that uses nylon 12 powder for the build material, for example, the powder may have to be heated to as high as 150° C. to keep the edges of the object flat. Testing indicates that heating nylon 12 powder to temperatures above about 120° may make the powder unfit for reuse.

A new process has been developed to help stabilize the powdered build material at a lower temperature. In one example, powdered build material is consolidated and the object slice is formed within the volume of consolidated powdered build material. The consolidated build material provides a more stable base to help keep the object flat at lower temperatures compared to unconsolidated build material. Build material may be consolidated, for example, by heating build material to a temperature at least as high as the boiling point of a liquid binder but lower than a damaging temperature, and then applying the liquid binder to the heated volume of substrate. The build material powder exhibits more adhesion after the liquid evaporates from the binder compared to untreated powder. In one specific example, a nylon 12 powdered build material is heated to about 100° C. and treated with a latex ink. The latex ink binder generates sufficient consolidation after the water evaporates from the treated powder for a more stable base compared to unconsolidated nylon 12 powder. The treated powder is dry but not as fine grained as untreated powder. The untreated nylon 12 powder is not damaged by the lower temperature and, thus, may be recycled for reuse.

A processor readable medium with instructions for consolidating powdered build material during an additive manufacturing process may be implemented, for example, in a CAD computer program product, in an object model processor, or in a controller for the additive manufacturing machine.

As used in this document: a "binder" means a substance that consolidates or helps consolidate a powdered build material; "consolidate" means to make stronger or more stable; "powder" means a dry substance made up of small pieces of something; a "coalescing agent" means a substance that causes or helps cause a build material to coalesce or solidify or to both coalesce and solidify; a "coalescence modifier agent" means a substance that inhibits or prevents coalescence of a build material, for example by modifying the effect of a coalescing agent; and "light" means electromagnetic radiation of any wavelength.

Figure 1:
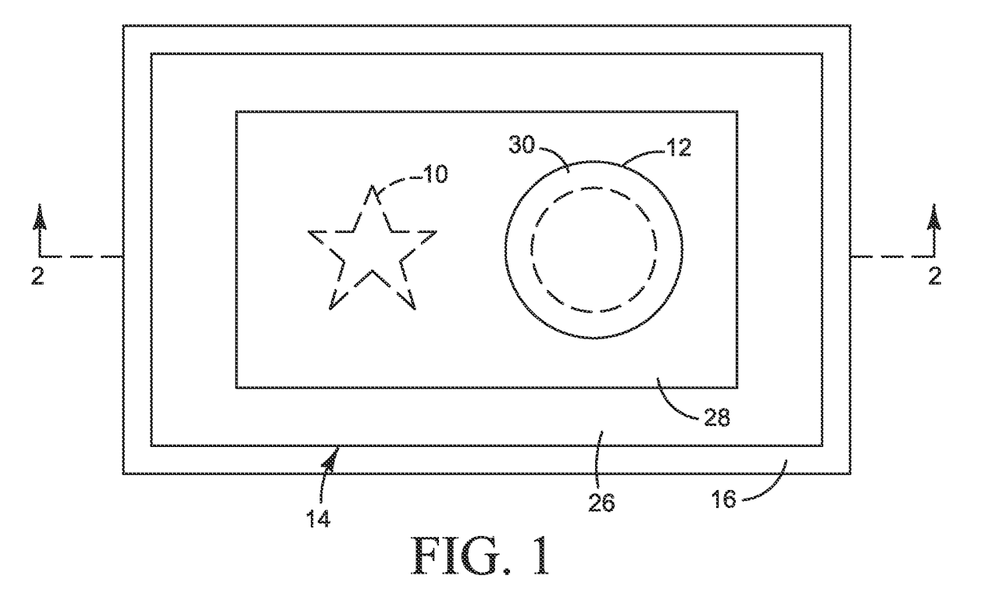
FIGS. 1 and 2 are plan and section views, respectively, illustrating two objects being manufactured using one example of a consolidated build material.
Figure 2:
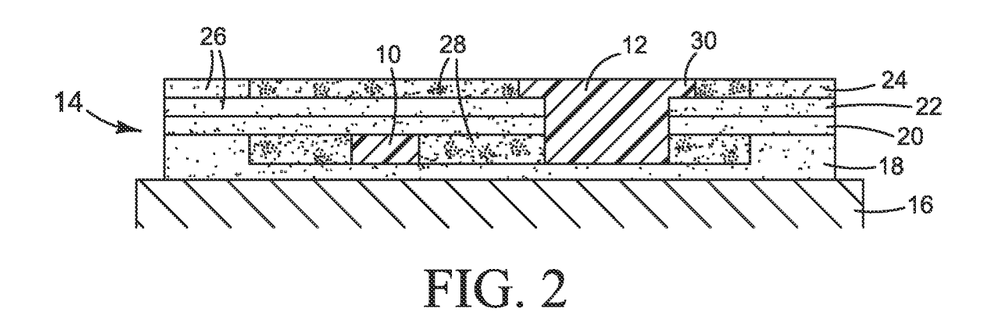
Figure 3:
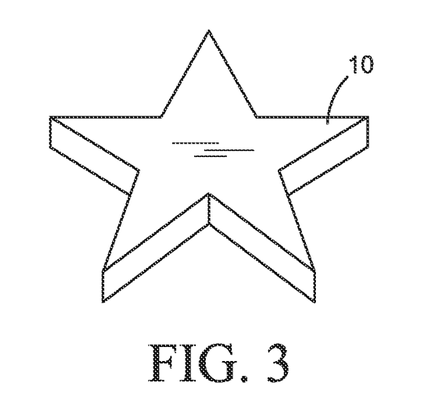
FIGS. 3 and 4 are perspectives showing the objects from FIGS. 1 and 2.
Figure 4:
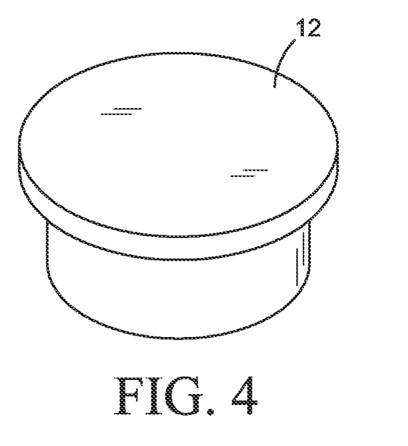

FIGS. 1 and 2 are plan and section views, respectively, illustrating one example of a first, single slice object 10 and a second, multiple slice object 12 being manufactured using a consolidated build material. The finished objects 10 and 12 are shown in FIGS. 3 and 4. Referring to FIGS. 1 and 2, an in-process structure 14 is supported on a platform or other support 16 in an additive manufacturing machine (not shown). Objects 10 and 12 are formed in successive layers 18, 20, 22 and 24 of powdered build material 26. First object 10 is formed in a first layer 18 of build material 26 that has been consolidated, as indicated by the clumpy stippled volume 28 in FIG. 2, and then solidified. Second object 12 is formed in first through fourth layers 18-24 of powdered build material 26 that have been successively solidified, including an overhanging part 30 formed in a consolidated volume 28 of layer 24.

Any suitable powdered build material may be used, including for example metals, composites, ceramics, glass and polymers, and processed to make the desired solid object which may be hard or soft, rigid or flexible, elastic or inelastic. The finished parts 10, 12 shown in FIGS. 3 and 4 are obtained by separating the two objects 10, 12 from the surrounding build material. While two simple objects 10, 12 made with just a few layers of build material are shown to illustrate the use of a consolidated build material 28, a consolidated build material may be used for complex objects manufactured in a single layer or in multiple layers.

Figure 5:
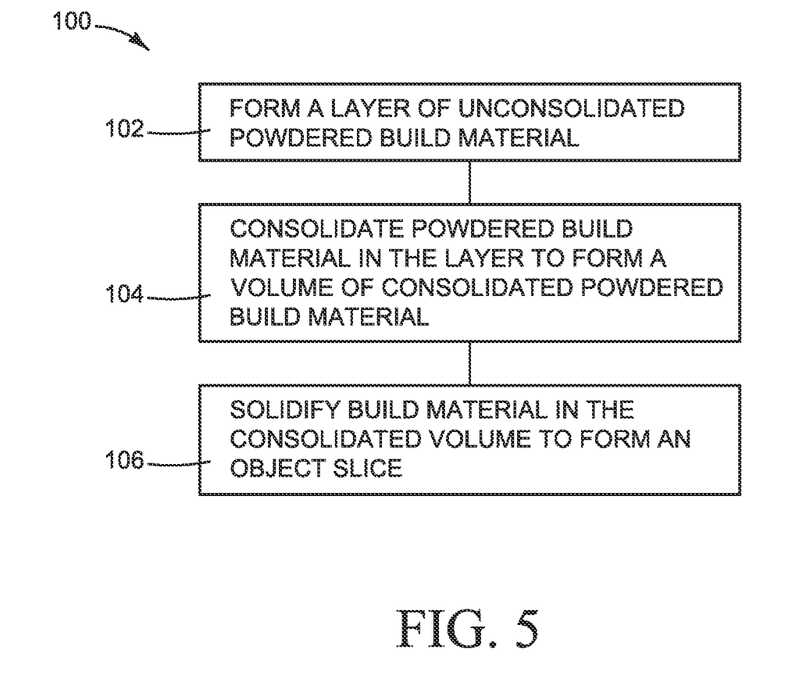
FIG. 5 is a flow diagram illustrating one example of an additive manufacturing process.
Figure 6:
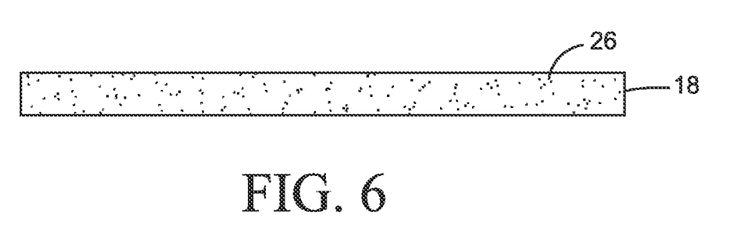
FIGS. 6-8 are cross sections illustrating one example of an object being manufactured with the process of FIG. 5.
Figure 7:
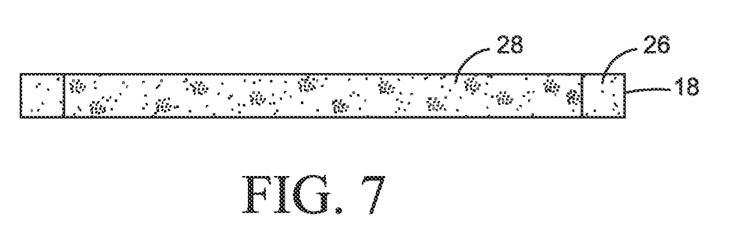
Figure 8:
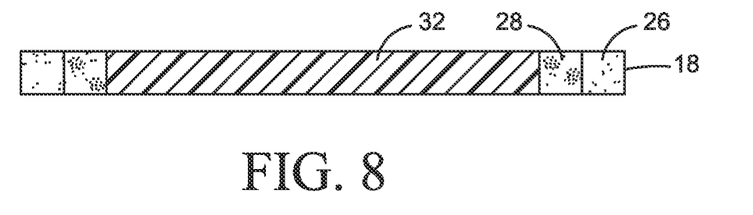

FIG. 5 is a flow diagram illustrating one example of an additive manufacturing process 100. FIGS. 6-8 are cross sections illustrating one example of an object 10 being manufactured with process 100 of FIG. 5. Referring to FIGS. 5-8, a layer 18 of unconsolidated powdered build material 26 is formed, as shown in FIG. 6 (block 102 in FIG. 5). Layer 18 may be formed on any suitable supporting structure, such as a platform 16 shown in FIG. 1, or on an underlying slice or object formed previously. Build material layer 18 may be formed with any suitable technique including, for example, layering powdered build material or dispensing a build material slurry and drying the slurry to a powder.

Build material in layer 18 is consolidated to form a volume of consolidated build material 28, as shown in FIG. 7 (block 104 in FIG. 5). Build material within consolidated volume 28 is solidified in the desired pattern to form an object slice 32, as shown in FIG. 8 (block 106 in FIG. 5). While the exact stabilization mechanism is not known, testing suggests that consolidated build material 28 provides a "restoring" force at the edge of the slice pattern to help hold slice 32 flat during solidification, compared to a slice formed in unconsolidated build material.

Figure 9:
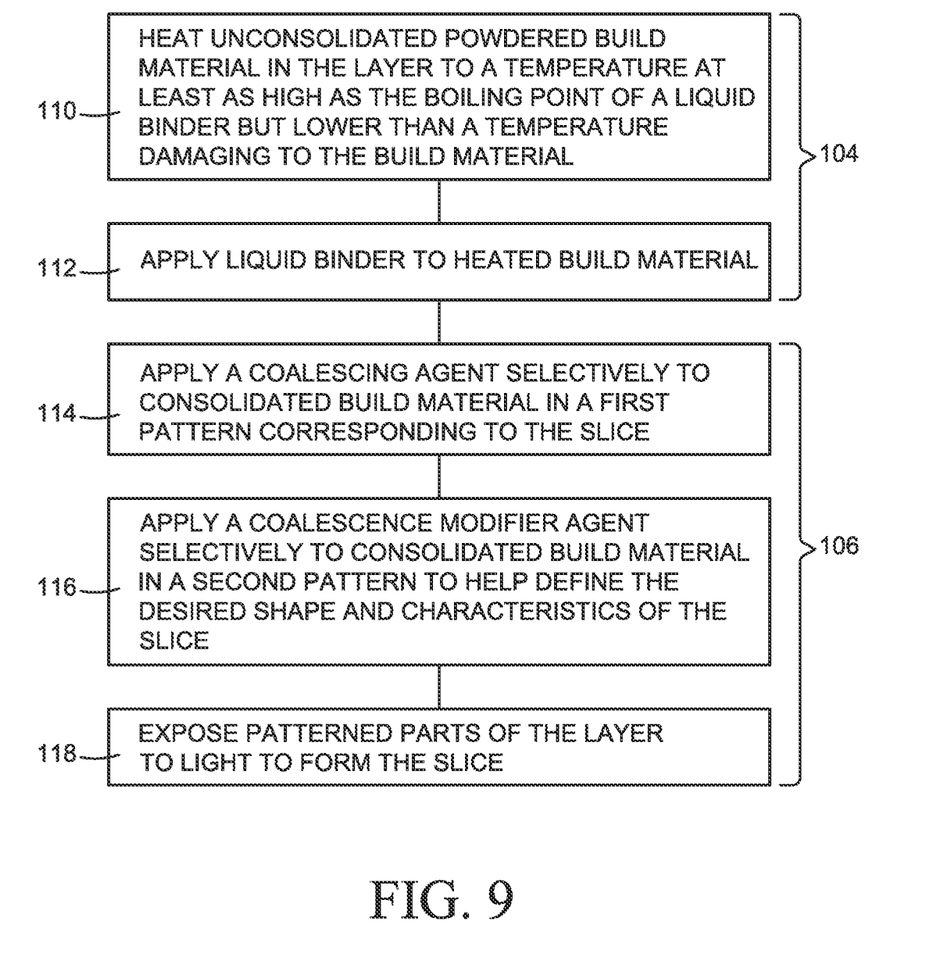
FIG. 9 is a flow diagram illustrating one example of consolidating and solidifying in the process shown in FIG. 5.
Figure 10:
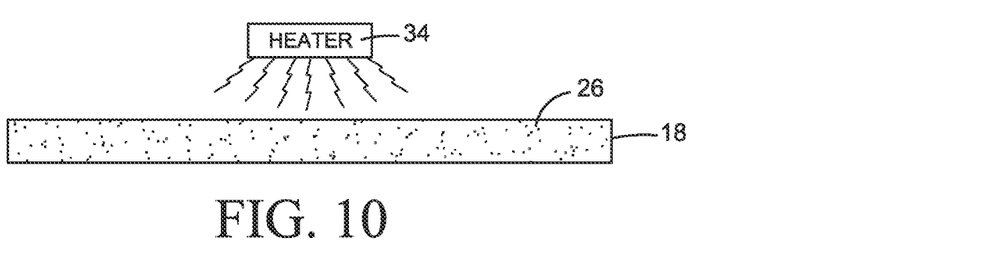
FIGS. 10-14 are cross sections illustrating one example of an object being manufactured with the process of FIG. 9.
Figure 11:
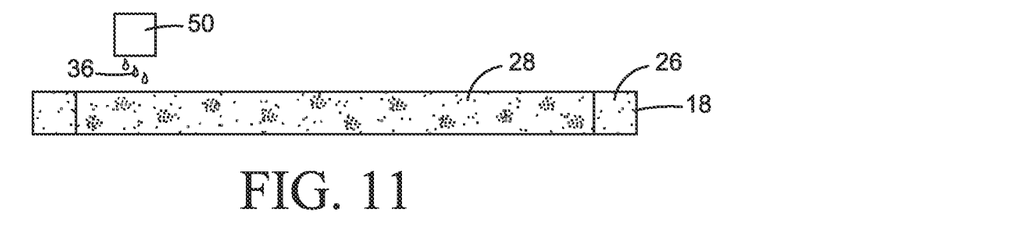
Figure 12:
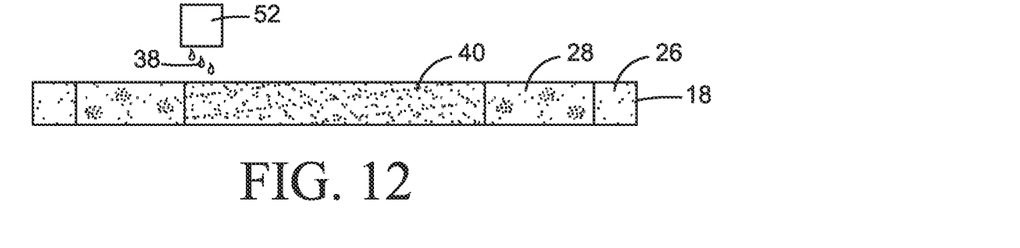

FIG. 9 is a flow diagram illustrating one example of consolidating and solidifying at blocks 104 and 106 in FIG. 5. FIGS. 10-14 are cross sections illustrating an object 10 being manufactured with the process of FIG. 9. Referring to FIGS. 9-14, unconsolidated powdered build material in layer 18 is heated to a temperature at least as high as the boiling point of a liquid binder but lower than a temperature damaging to build material 26, as shown in FIG. 10 (block 110 in FIG. 9). Any suitable heater 34 may be used. Liquid binder 36 is applied to heated build material as shown in FIG. 11 (block 112 in FIG. 9). Binder 36 dries in the heated build material to form a dry, consolidated powdered build material 28. In one specific example, a nylon 12 powdered build material 26 is heated to about 100° C. and treated with Hewlett-Packard Company's HP881 Latex Ink as the liquid binder 36. The treated nylon 12 powder 28 exhibits more adhesion after water evaporates from the ink compared to untreated powder 26. The consolidated powder is dry but not as fine grained as unconsolidated powder, and may appear clumpy. The untreated nylon 12 powder is not damaged at temperatures below about 120° C. and, thus, may be recycled for reuse.

Other consolidation techniques are possible. For example, a light-curable binder (wet or dry) may be applied to an unheated, unconsolidated powdered build material 26 and then exposed to light to cure the binder and form a consolidated dry build material 28. In one specific example of this technique, a polymer powdered build material at room temperature is treated with a UV (ultraviolet) curable ink such as Hewlett-Packard Company's HP HDR240 Scitex UV Curable Ink and then exposed to UV light to pin the ink and consolidate the polymer powder. For another example, a chemically reactive binder (wet or dry) may be applied to consolidate build material without added heat or light.

Figure 13:
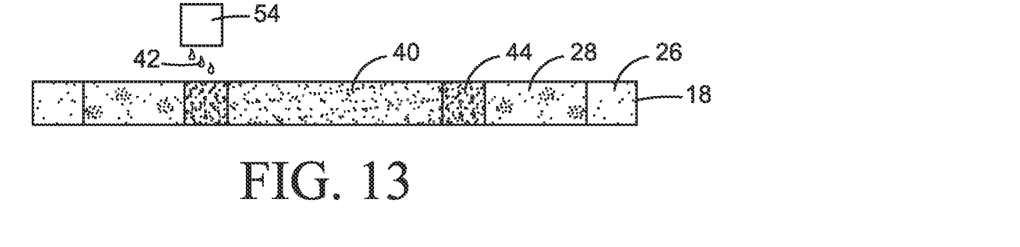
Figure 14:
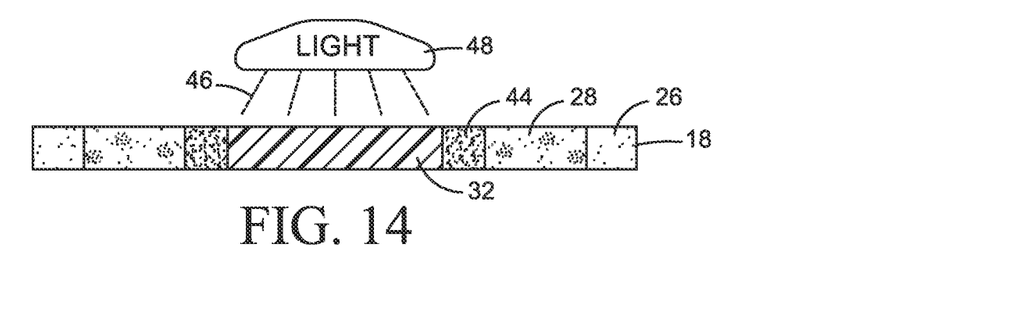

Referring again to FIGS. 9-14, a coalescing agent 38 is selectively applied to consolidated build material 28 in a first pattern 40 corresponding to a slice, as shown in FIG. 12 (block 114 in FIG. 9). A coalescence modifier agent 42 may also be selectively applied to consolidated build material 28 in a second pattern 44 to help define the desired shape and characteristics of the slice, as shown in FIG. 13 (block 116 in FIG. 9). A coalescence modifier agent 40 may be used to modify the effect of the coalescing agent and applied, for example, along the edge of the coalescence agent to help reduce the effects of lateral coalescence bleed and improve the definition of the edges of the slice. A modifier agent 40 can also be interspersed with the pattern of the coalescing agent to change the material characteristics of the slice. Then, as shown in FIG. 14, the patterned parts of layer 18 are exposed to light 46 from a light source 48 to form slice 32 (block 118 in FIG. 9).

While any suitable dispenser 50, 52, 54 may be used for binder 32, coalescing agent 38, and coalescence modifier agent 42, inkjet printheads are often used in additive manufacturing machines because of the precision with which they can dispense agents and their flexibility to dispense different types and formulations of agents. Also, while three distinct dispensers 50-54 are shown, two or more of the dispensers may be integrated into a single device, for example using different printheads (or groups of printheads) in a single inkjet printhead assembly.

Figure 15:
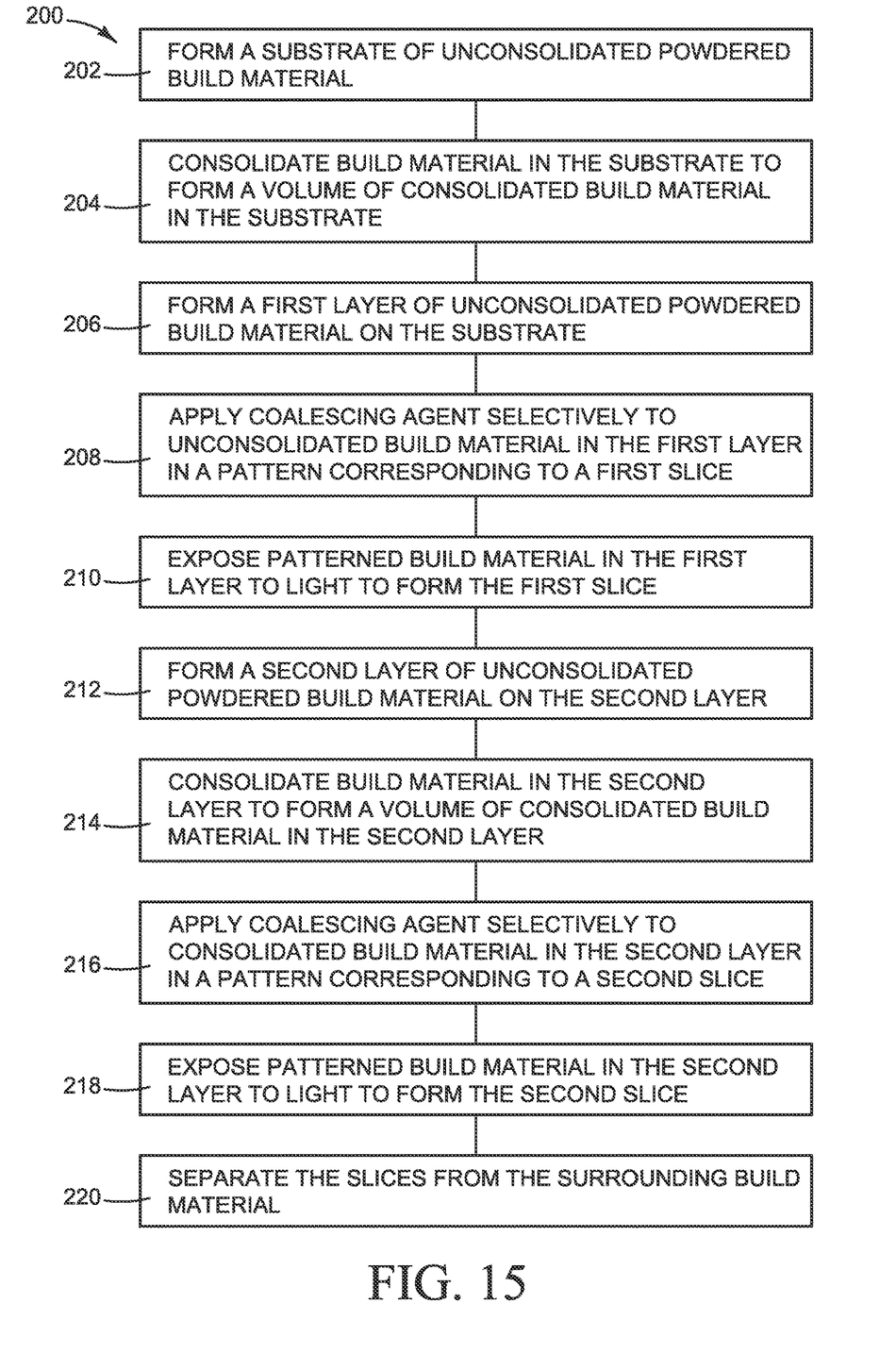
FIG. 15 is a flow diagram illustrating another example of an additive manufacturing process.

Forming object slices within a volume of consolidated build material, as described above, may be combined with the use of consolidated build material as an underlying substrate. FIG. 15 is a flow diagram illustrating an example of an additive manufacturing process 200 in which some of the object slices are formed within a volume of consolidated build material and some are formed on a substrate of consolidated build material. FIGS. 16-25 are cross sections illustrating an object 12 being manufactured with the process of FIG. 15.

Figure 16:
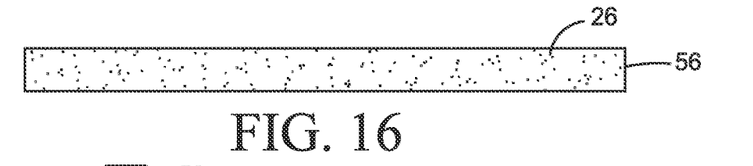
FIGS. 16-25 are cross sections illustrating one example of an object being manufactured with the process of FIG. 15.
Figure 17:
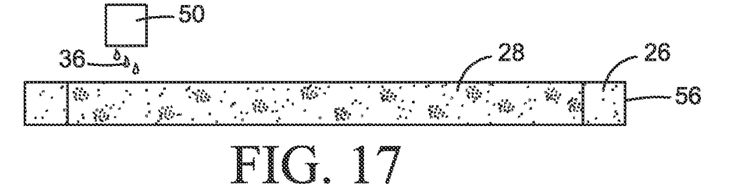
Figure 18:
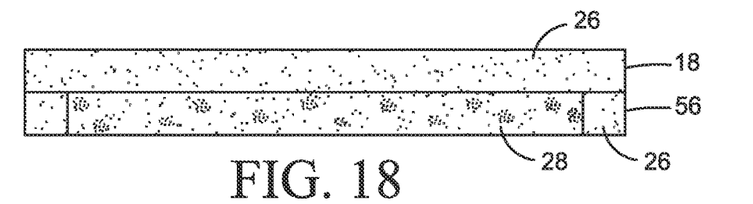
Figure 19:
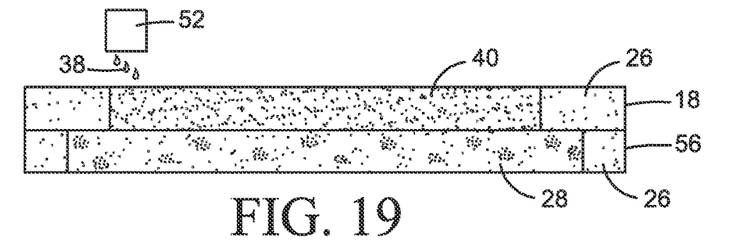
Figure 20:
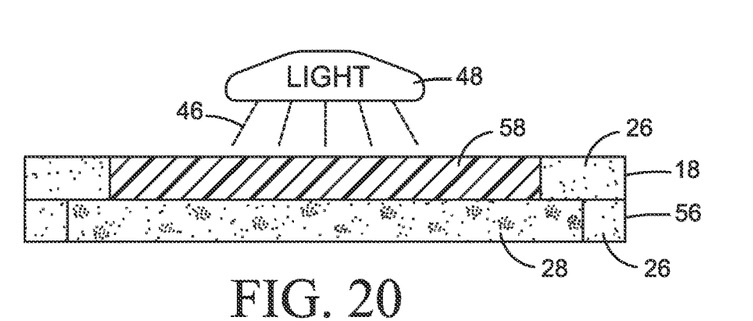

Referring to FIGS. 15-25, a substrate 56 of unconsolidated of powdered build material 26 is formed, as shown in FIG. 16 (block 202 of FIG. 15), and then build material 26 in substrate 56 is consolidated to form a volume of consolidated build material 28, as shown in FIG. 17 (block and 204 in FIG. 15). A first layer 18 of unconsolidated powdered build material 26 is formed on substrate 56, coalescing agent 38 applied to unconsolidated build material 26 in a pattern of a first slice, and the patterned build material exposed to light to form the first slice 58, as shown in FIGS. 18-20 (blocks 206, 208 and 210 in FIG. 15).

Figure 21:
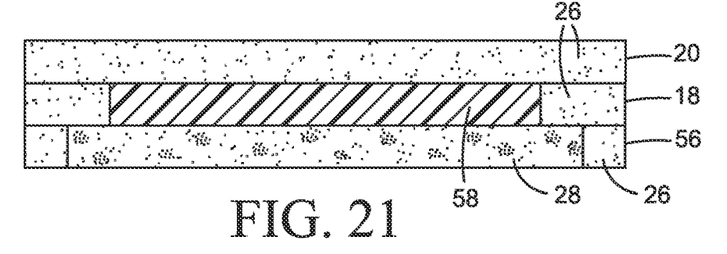
Figure 22:
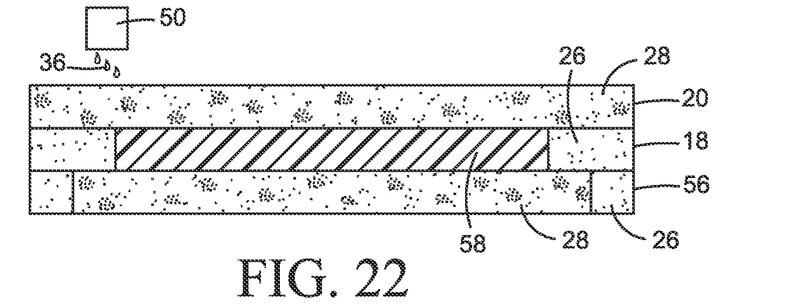
Figure 23:
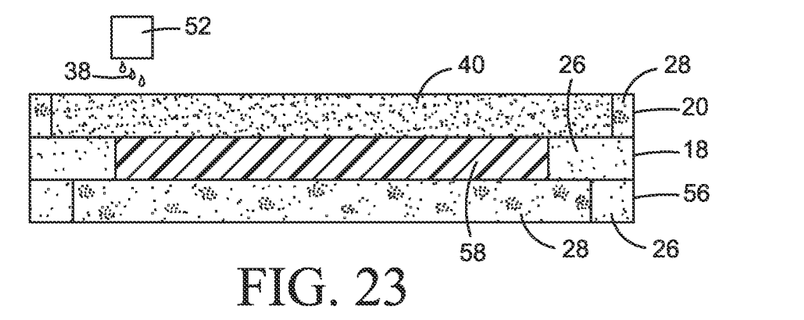
Figure 24:
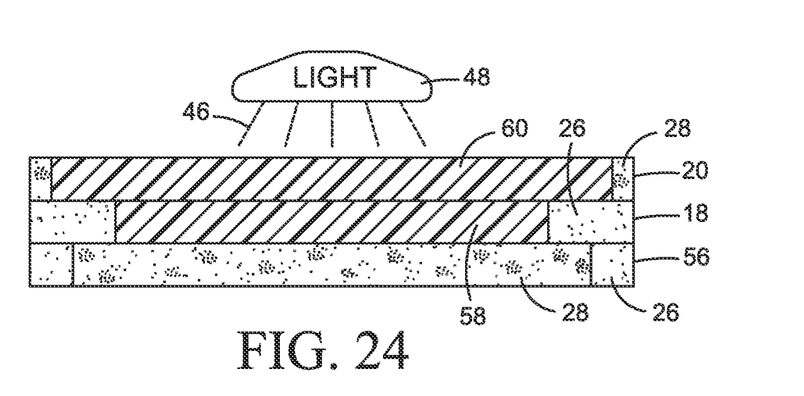
Figure 25:
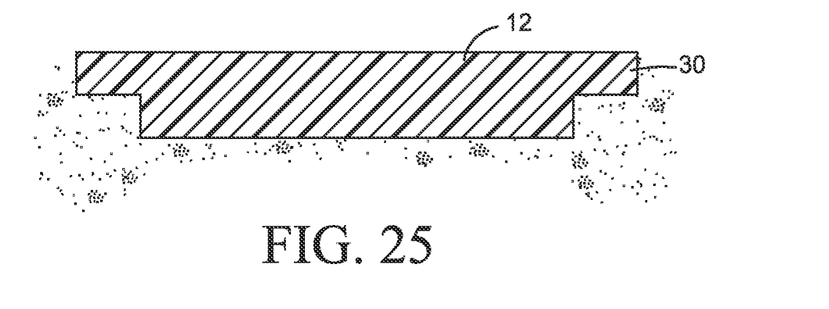

A second layer 20 of unconsolidated powdered build material 26 is formed on first slice 58, as shown in FIG. 21 (block 212 in FIG. 15). Build material 26 in second layer 20 is consolidated to form a volume of consolidated powdered build material 28, as shown in FIG. 22 (block 214 in FIG. 15). A coalescing agent 38 is applied to consolidated build material 28 in a pattern corresponding to a second slice, as shown in FIG. 23 (block 216 in FIG. 15), and the patterned build material 28 exposed to light to form the second slice 60, as shown in FIG. 24 (block 218 in FIG. 15). Slices 58 and 60 are separated from the surrounding build material to form object 12, as shown in FIG. 25 (block 220 in FIG. 15).

Figure 26:
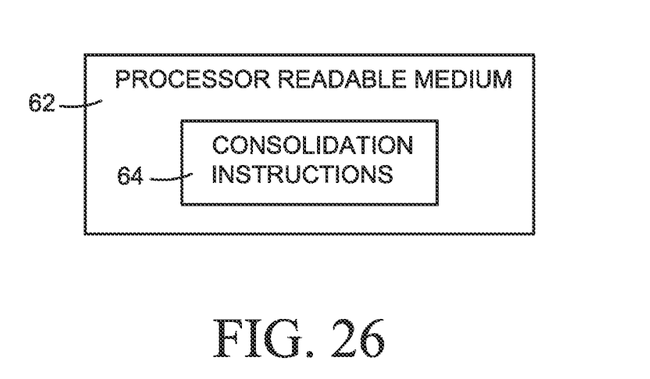
FIG. 26 is a block diagram illustrating one example of a processor readable medium with instructions to form a build material substrate during the manufacture of a 3D object, using the process of FIG. 5 for example, such as might be used with the additive manufacturing machine of FIG. 27 or with the system of FIG. 28.

FIG. 26 is a block diagram illustrating a processor readable medium 62 with instructions 64 to consolidate build material during the manufacture of a 3D object. A processor readable medium 62 is any non-transitory tangible medium that can embody, contain, store, or maintain instructions for use by a processor. Processor readable media include, for example, electronic, magnetic, optical, electromagnetic, or semiconductor media. More specific examples of suitable processor readable media include a hard drive, a random access memory (RAM), a read-only memory (ROM), memory cards and sticks and other portable storage devices.

Instructions 64 include instructions to consolidate powdered build material, for example as shown at block 104 in FIG. 5 and blocks 204 and 214 in FIG. 15. Instructions 64 may also include other manufacturing instructions, for example instructions to form and solidify shown at blocks 102 and 106 in FIG. 5. Processor readable medium 62 with instructions 64 may be implemented, for example, in a CAD computer program product, in an object model processor, or in a controller for an additive manufacturing machine. Control data to consolidate powdered build material can be generated, for example, by processor readable instructions on the source application, usually a CAD computer program product, in an object model processor, or by processor readable instructions on the additive manufacturing machine.

Figure 27:
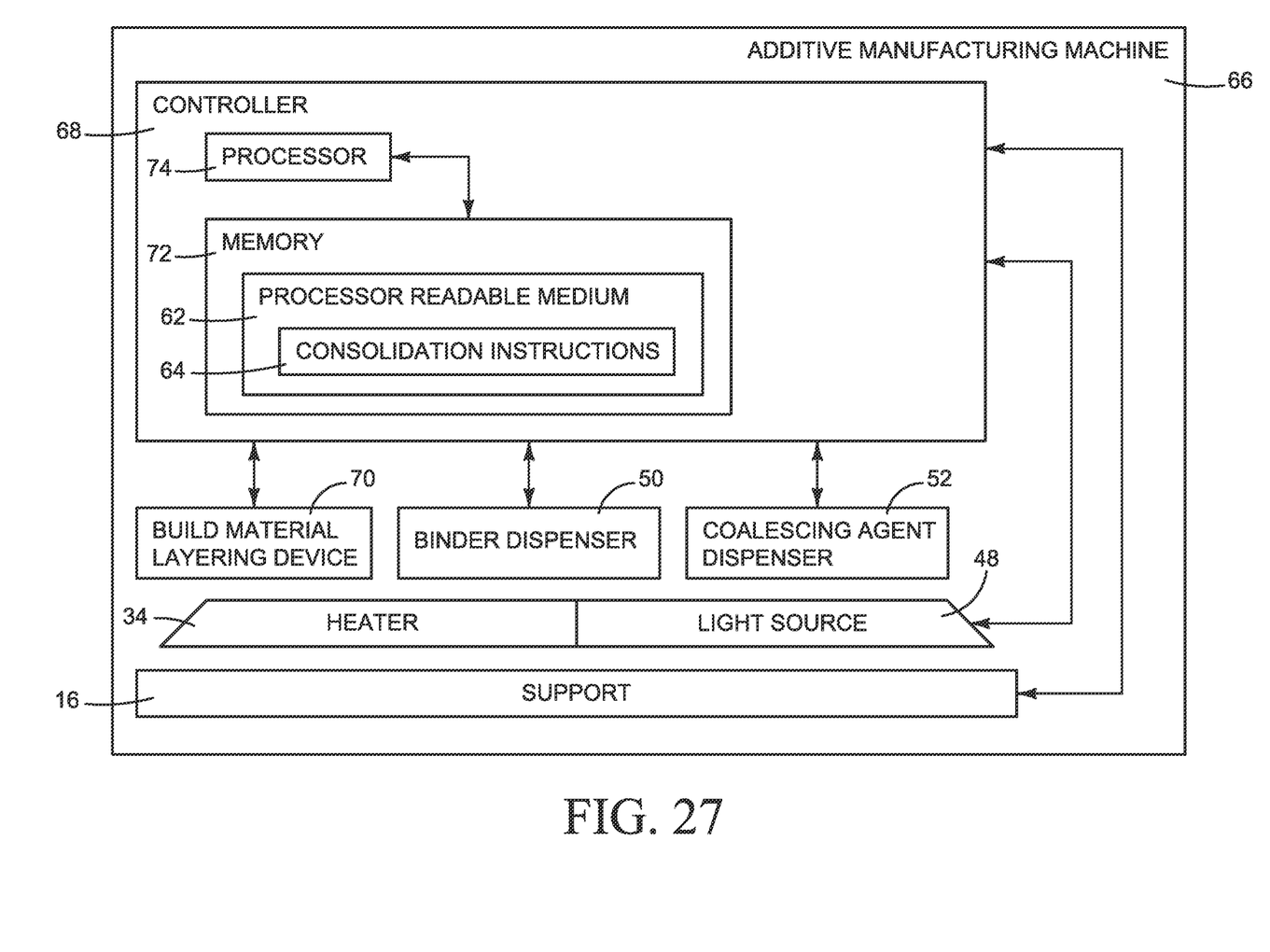
FIG. 27 is a block diagram illustrating one example of an additive manufacturing machine implementing a controller with instructions to consolidate build material during manufacture of a 3D object.

FIG. 27 is a block diagram illustrating one example of an additive manufacturing machine 66 implementing a controller 68 with instructions 64 to consolidate a substrate volume during the manufacture of a 3D object. Referring to FIG. 27, machine 66 includes controller 68, a support 16, a build material layering device 70, a binder dispenser 50, a coalescing agent dispenser 52, a heater 34 and a light source 48. The in-process object structure is supported on support 16 during manufacturing. In some machines 66, support 16 may support the in-process structure during separation of the object from the surrounding build material. Also, in some machines 66, support 16 is movable at the urging of controller 68 to compensate for the changing thickness of the in-process structure, for example as layers of build material are added during manufacturing.

Build material layering device 70 is to layer build material on support 16 and on the in-process structures and may include, for example, a device to dispense the build material and a blade or roller to distribute the build material uniformly to the desired thickness for each layer. Binder dispenser 50 is to dispense binder selectively at the direction of controller 68, as described above with reference to FIGS. 5-25. Coalescing agent dispenser 52 is to dispense coalescing agent selectively at the direction of controller 68, as described above with reference to FIGS. 9-27. Manufacturing machine 66 may include a heater 34 if it is desired to heat build material. Manufacturing machine 66 includes a light source 48 to apply light energy to solidify build material treated with coalescing agent.

Controller 68 represents the processor (or multiple processors), the associated memory (or multiple memories) and instructions, and the electronic circuitry and components needed to control the operative elements of machine 66. In particular, controller 68 includes a memory 72 having a processor readable medium 62 with consolidation instructions 64 and a processor 74 to read and execute instructions 64. For example, controller 68 would receive control data and other instructions from a CAD program to make an object and execute local instructions 64 to consolidate build material as part of the process of making the object.

Figure 28:
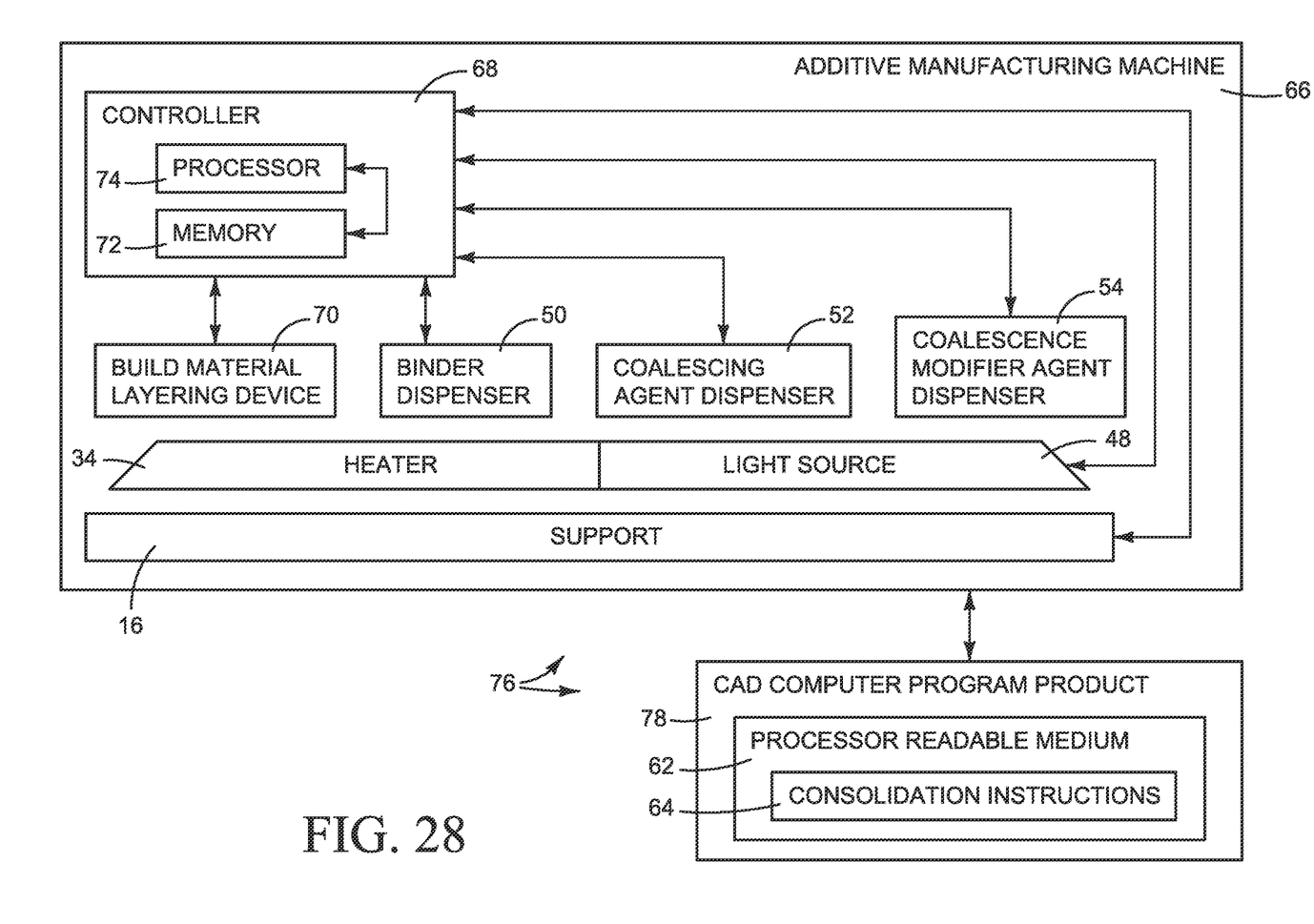
FIG. 28 is a block diagram illustrating one example of an additive manufacturing system implementing a CAD computer program product with instructions to consolidate build material during manufacture of a 3D object.

Alternatively, consolidation instructions 64 may be embodied in a processor readable medium 62 separate from controller 68, for example as part of a CAD computer program product shown in FIG. 28. Referring to FIG. 28, an additive manufacturing system 76 includes an additive manufacturing machine 66 operatively connected to a CAD computer program product 78 with the instructions to consolidate parts of the substrate during manufacture of the object. In this example, CAD program 78 includes processor readable medium 62 with consolidation instructions 64. Any suitable connection between machine 66 and CAD program 78 may be used to communicate instructions and control data to machine 66 including, for example, a wired link, a wireless link, and a portable connection such as a flash drive or compact disk. Also, in this example, additive manufacturing machine 66 includes a coalescence modifier agent dispenser 54. Inkjet printheads or another suitable dispenser 54 is to dispense coalescence modifier agent selectively on to build material at the direction of controller 68 executing instructions from CAD program product 78.

Light source 48 applies light energy to build material to cause the solidification of portions of the build material according to where coalescing agent has been delivered or has penetrated. In some examples, light source 48 is an infra-red (IR) or near infra-red light source, a halogen light source, or a light emitting diode. Light source 48 may be a single light source or an array of multiple light sources. In some examples, light source 48 is configured to apply light energy in a substantially uniform manner simultaneously to the whole surface of a layer of build material. In other examples, light source 48 is configured to apply energy to just select areas of the whole surface of a layer of build material. Light source 48 may be moved or scanned across the layer of build material such that a substantially equal amount of energy is applied to the selected areas or across the whole surface of a layer of build material.

The combination of build material, coalescing agent, coalescence modifier agent, and light energy may be selected for an object slice so that (1) build material with no coalescing agent does not coalesce when the energy is applied, (2) build material with just coalescing agent solidifies when energy is applied; or (3) build material with both agents undergo a modified degree of coalescence between no coalescence and solidification with or without the application of energy.

Suitable coalescing agents include pigments, dyes, polymers and other substances that have significant light absorption. Carbon black ink and light absorbing color inks commercially known as CM997A, CE039A and CE042A available from Hewlett-Packard Company are suitable coalescing agents with the appropriate light source.

Suitable coalescence modifier agents may separate individual particles of the build material to prevent the particles from joining together and solidifying as part of the slice. Examples of this type of coalescence modifier agent include colloidal, dye-based, and polymer-based inks, as well as solid particles that have an average size less than the average size of particles of the build material. In one example, a salt solution may be used as a coalescence modifier agent. In other examples, inks commercially known as CM996A and CN673A available from Hewlett-Packard Company may be used as a coalescence modifier agent.

Suitable coalescence modifier agents may act to modify the effects of a coalescing agent by preventing build material from reaching temperatures above its melting point during heating. A fluid that exhibits a suitable cooling effect may be used as this type of coalescence modifier agent. For example, when build material is treated with a cooling fluid, energy applied to the build material may be absorbed evaporating the fluid to help prevent build material from reaching its melting point. Thus, for example, a fluid with a high water content may be a suitable coalescence modifier agent.

Other types of coalescence modifier agent may be used. An example of a coalescence modifier agent that may increase the degree of coalescence may include, for example, a plasticizer. Another example of a coalescence modifier agent that may increase the degree of coalescence may include a surface tension modifier to increase the wettability of particles of build material.

"A" and "an" used in the claims means one or more.

The examples shown in the figures and described above illustrate but do not limit the patent, which is defined in the following Claims.

What is claimed is:

1. An additive manufacturing process, comprising:
   a layering device forming a layer of unconsolidated powdered build material;
   a first dispenser dispensing a binder on to unconsolidated powdered build material in the layer to form consolidated build material;
   a second dispenser dispensing a coalescing agent on to consolidated powdered build material in the layer;
   a third dispenser dispensing a coalescence modifier agent on to consolidated powdered build material in the layer; and
   a light source applying light energy to build material with coalescing agent in the layer.

2. The process of claim 1, comprising:
   the layering device forming a substrate of unconsolidated powdered build material;
   the first dispenser dispensing the binder on to the substrate to form a consolidated build material substrate; and
   the layering device forming the layer of unconsolidated build material on the consolidated build material substrate.

3. A non-transitory processor readable medium including instructions thereon that when executed cause an additive manufacturing machine to:
   form a layer of unconsolidated powdered build material;
   dispense a binder on to unconsolidated powdered build material in the layer to form consolidated build material;
   dispense a coalescing agent on to consolidated powdered build material in the layer;
   dispense a coalescence modifier agent on to consolidated powdered build material in the layer; and
   apply light energy to build material with coalescing agent in the layer.

4. The medium of claim 1, including instructions to:
   form a substrate of unconsolidated powdered build material;
   dispense the binder on to the substrate to form a consolidated build material substrate; and
   form the layer of unconsolidated powdered build material on the consolidated build material substrate.

5. A computer program product that includes the processor readable medium of claim 3.

6. An additive manufacturing machine controller that includes the processor readable medium of claim 3.

7. An additive manufacturing machine, comprising:
   a layering device to layer unconsolidated powdered build material;
   a binder;
   a first dispenser to dispense the binder;
   a coalescing agent;
   a second dispenser to dispense the coalescing agent;
   a coalescence modifier agent;
   a third dispenser to dispense the coalescence modifier agent;
   a light source to apply light energy to build material; and
   a controller to execute instructions to:
   cause the layering device to form a layer of unconsolidated powdered build material;
   cause the first dispenser to dispense the binder on to unconsolidated powdered build material in the layer to form consolidated build material;
   cause the second dispenser to dispense the coalescing agent on to consolidated powdered build material in the layer;
   cause the third dispenser to dispense the coalescence modifier agent on to consolidated powdered build material in the layer; and
   cause the light source to apply light energy to build material with coalescing agent in the layer.

8. The machine of claim 7, where the controller is to execute instructions to:
   cause the layering device to form a substrate of unconsolidated powdered build material;
   cause the first dispenser to dispense the binder on to the substrate to form a consolidated build material substrate; and
   cause the layering device to form the layer of unconsolidated powdered build material on the consolidated build material substrate.

* * * * *